US009207022B2

(12) United States Patent
Sheu et al.

(10) Patent No.: US 9,207,022 B2
(45) Date of Patent: Dec. 8, 2015

(54) COOLING JACKET

(71) Applicant: DELTA ELECTRONICS, INC., Taoyuan Hsien (TW)

(72) Inventors: Hong-Cheng Sheu, Taoyuan Hsien (TW); Hung-Chi Lo, Taoyuan Hsien (TW)

(73) Assignee: Delta Electronics, Inc., Taoyuan (TW)

( * ) Notice: Subject to any disclaimer, the term of this patent is extended or adjusted under 35 U.S.C. 154(b) by 377 days.

(21) Appl. No.: 13/681,860

(22) Filed: Nov. 20, 2012

(65) Prior Publication Data

US 2013/0126144 A1 May 23, 2013

(30) Foreign Application Priority Data

Nov. 23, 2011 (TW) .............................. 100142816 A

(51) Int. Cl.
*H02K 5/20* (2006.01)
*F28F 1/40* (2006.01)
*F28F 1/00* (2006.01)

(52) U.S. Cl.
CPC ... *F28F 1/00* (2013.01); *F28F 1/40* (2013.01); *H02K 5/20* (2013.01)

(58) Field of Classification Search
CPC ............. H02K 9/16; H02K 9/19; H02K 9/20; H02K 5/20; F28F 1/40; F28F 1/00
USPC .................. 165/175, 176, 144; 310/52, 54, 59
See application file for complete search history.

(56) References Cited

U.S. PATENT DOCUMENTS

| 1,853,646 | A | * | 4/1932 | Von Kando | 310/54 |
| 3,447,002 | A | * | 5/1969 | Ronnevig | 310/54 |
| 3,459,979 | A | * | 8/1969 | Carew et al. | 310/54 |
| 3,681,628 | A | * | 8/1972 | Krastchew | 310/54 |
| 3,991,457 | A | * | 11/1976 | Barton | 29/890.038 |
| 4,386,652 | A | * | 6/1983 | Dragojevic | 165/144 |
| 2003/0048031 | A1 | | 3/2003 | Dunlap et al. | |
| 2003/0222519 | A1 | * | 12/2003 | Bostwick | 310/58 |
| 2005/0145380 | A1 | * | 7/2005 | Usui | 165/177 |
| 2007/0075595 | A1 | * | 4/2007 | Narayanan et al. | 310/52 |
| 2010/0007227 | A1 | | 1/2010 | Smith et al. | |

FOREIGN PATENT DOCUMENTS

| CN | 1885683 A | 12/2006 |
| CN | 201766806 U | 3/2011 |
| CN | 102025226 A | 4/2011 |

OTHER PUBLICATIONS

Office Action issued on Aug. 29, 2014 in corresponding CN application No. 2011103765942.

(Continued)

*Primary Examiner* — Tho V Duong
(74) *Attorney, Agent, or Firm* — Muncy, Geissler, Olds & Lowe, P.C.

(57) ABSTRACT

A cooling jacket for cooling an electric motor is provided. The cooling jacket has one or more than one wave-shaped pipe, covering the electric motor, for conducting working fluid, wherein each wave-shaped pipe has a forwarding portion and a reversed portion, parallel to the axis of the electric motor, for conducting the working fluid to flow in opposite directions, wherein the forwarding portion includes at least two forwarding sub-pipes, and the reversed portion includes at least two reversed sub-pipes; and a turning portion, connected between the forwarding portion and the reversed portion.

9 Claims, 7 Drawing Sheets

(56) References Cited

OTHER PUBLICATIONS

Office Action issued on Feb. 24, 2014 in corresponding TW application No. 100142816.

Tsai, Jhong-Syuan, "The measurement and numerical analysis of the water flow distribution in compact parallel flow heat exchangers", A Thesis, Dep't of Mechanical Engineering, National Yunlin Univ. of Science and Tech., Jun. 2010, Taiwan, Republic of China, 75 pages.

* cited by examiner

COOLING JACKET

CROSS REFERENCE TO RELATED APPLICATIONS

This Non-provisional application claims priority under 35 U.S.C. §119(a) on Patent Application No(s). 100142816, filed in Taiwan, Republic of China on Nov. 23, 2011, the entire contents of which are hereby incorporated by reference.

BACKGROUND OF THE INVENTION

1. Field of the Invention

The present invention relates to heat dissipating technology for electric motors.

2. Description of the Related Art

To maintain the performance and prolong the lifecycle of an electric motor, the heat generated when the electric motor is operating has to be appropriately removed. The prior art usually uses a cooling pipe and the working fluid flowing through the cooling pipe to remove the heat generated from the electric motor.

FIG. 1A is a structural view of the cooling pipe in the prior art. The cooling jacket 100 can be used to remove heat from the electric motor. The electric motor is not shown in this Figure for simplicity (where the arrow represents the axis direction of the electric motor). As shown in FIG. 1, the pipe in the cooling jacket 100 is substantially in a wave shape, covering the surface of the electric motor. The working fluid is injected into the cooling jacket 100 through the working fluid inlet 110, changes its flow direction several times, and is finally expelled from the working fluid outlet 120. The turning portion between tubes has a different length L (as labeled in this Figure) in different designs. Generally, the shorter the length L of the turning portion, the higher the manufacturing cost; while the longer the length L of the operating portion, the more the heat concentrates there. Some designs attempt to improve the heat dissipating ability by enlarging the pipe diameter and increasing the quantity of the working fluid, but usually achieve limited success. FIG. 1B shows a corner of the pipe in the prior art which has an enlarged diameter. In FIG. 1B, when the working fluid flows into the pipe, the inertia of the working fluid tends to make the stream A stop flowing or flow in a reversed direction with respect to the stream B, thus causing heat to concentrate where the stream A is.

Therefore, a new cooling jacket for cooling the electric motor which overcomes said defects is needed.

BRIEF SUMMARY OF THE INVENTION

The present invention provides a cooling jacket for cooling an electric motor. The cooling jacket comprises one or more wave-shaped pipes, covering the electric motor, for conducting working fluid, wherein each wave-shaped pipe comprises a forwarding portion and a reversed portion, parallel to the axis of the electric motor, for conducting the working fluid to flow in opposite directions, wherein the forwarding portion comprises at least two forwarding sub-pipes, and the reversed portion comprises at least two reversed sub-pipes; and a turning portion, connected between the forwarding portion and the reversed portion.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
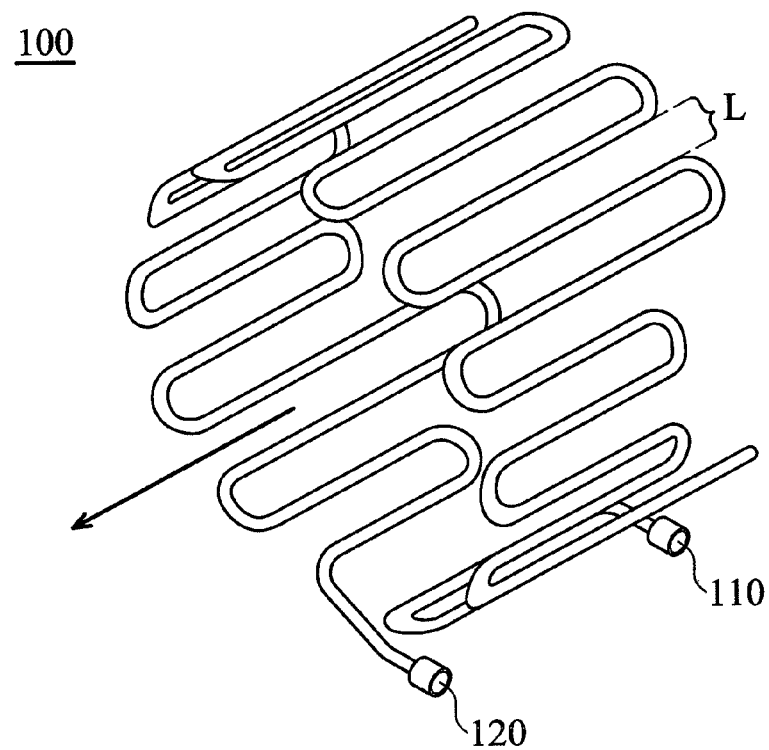
FIG. 1A is a structural view of the cooling pipe in the prior art.
Figure 1B:
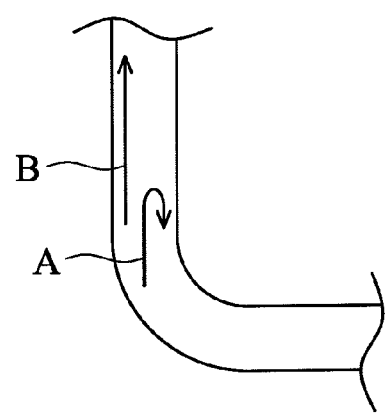
FIG. 1B shows a corner of the pipe in the prior art which has an enlarged diameter.
Figure 2A:
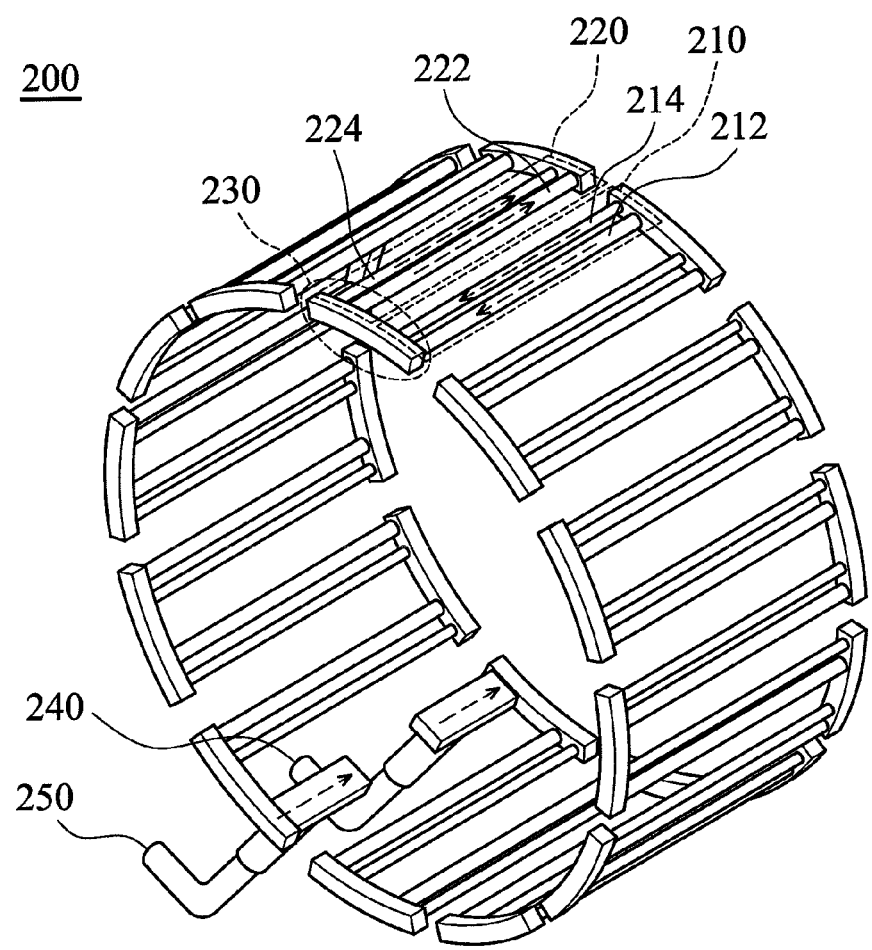
FIG. 2A is a three dimensional (3D) view of the cooling jacket according to an embodiment of the present invention.

FIG. 2A is a 3D view of the cooling jacket according to an embodiment of the present invention. Although the cooling jacket of the present invention is originally designed for high-power and high-accuracy electric motors such as motors and power generators, the present invention should not be limited thereto. In this embodiment, the cooling jacket 200 comprises a wave-shaped pipe which covers the circumference of the imaginary cylinder of the electric motor (the arrow in FIG. 2A represents the axis direction of the electric motor) and allows the working fluid to flow through there for removing heat from the electric motor and keeping the electric motor at its normal operating temperature. Generally, the working fluid of the present invention can be any liquid which has temperature not higher than the normal operating temperature of the electric motor. For example, the liquid can be water, lubricant oil, mixed liquid of 50% ethylene glycol and 50% water, or water with anti-freeze agent, however the present invention should not limited thereto. In addition, the liquid in the cooling jacket of the present invention can be propelled by various motors or pumps (not shown in Figs.).

For illustration, the wave-shaped pipe of the cooling jacket 200 of the present invention can be divided into three parts: forwarding portions 210, reversed portions 220 and turning portions 230. In order to cover the electric motor as completely as possible, the forwarding portion 210 and reversed portion 220 both extend along the axis direction of the electric motor and are juxtaposed to each other closely. The forwarding portion 210 and reversed portion 220 can respectively conduct the working fluid to flow in opposite directions (as shown by the arrows in the pipe in FIG. 2). The turning portion 230, in the embodiment of FIG. 2, extends along a circumferential direction of the electric motor, and is connected between the forwarding portion 210 and reversed portion 220. As shown in FIG. 2, the working fluid in the pipe flows through the forwarding portion 210, turns 90 degrees into the turning portion 230, and then turns another 90 degrees into the reversed portion 220. Through the present invention, the working fluid can have a great pressure drop when flowing through the turning portion 230, thus increasing the flow speed as well as the convective heat transfer rate (h value, in the unit of W/m2k) there. Since the heat exchanged between the cooling flow and the electric motor is basically in direct proportion to the convective heat transfer rate, the cooling jacket of the present invention can greatly improve the amount of exchanged heat and overcome the defects of the spiral shaped cooling pipes in the prior art. In addition, the most important features of the present invention are that the forwarding portion 210 further comprises at least two forwarding sub-pipes 212 and 214, and the reversed portion 220 further comprises at least two reversed sub-pipes 222 and 224, which will be discussed later.

Figure 2B:
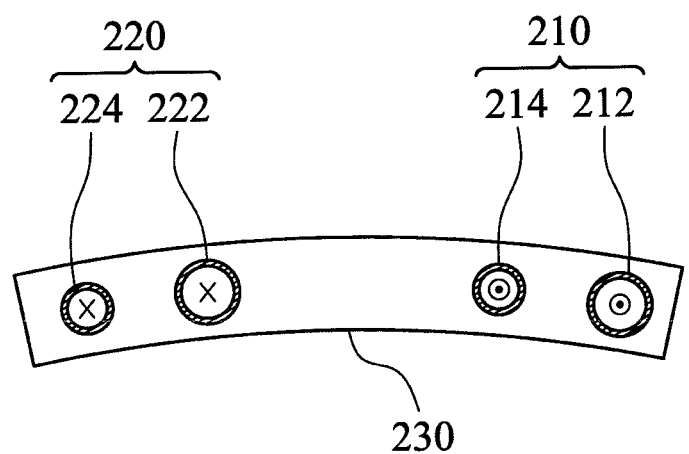
FIG. 2B is the profile of the cooling jacket 200 in FIG. 2A.

FIG. 2B is the profile of the cooling jacket 200 in FIG. 2A. In a better embodiment, the fluid is injected to the forwarding sub-pipes 212 and 214 (out of the paper), flows through the turning portion 230, and then flows into the reversed sub-pipes 222 and 224 (into the paper). The two forwarding sub-pipes 212 and 214 of the forwarding portion 210 of the present invention may be designed to have different pipe diameters and allow different amounts of fluid quantity to flow through them. Specifically, if the forwarding sub-pipes 212 and 214 have the same pipe diameters, the working fluid, due to fluid inertia, tends to surge to the sub-pipe 212, which is closer to the corner where the flow flows into, instead of to the sub-pipe 214, thus lowering or stopping the flow speed of the fluid, causing heat to concentrate. Therefore, in the present invention, to equalize the flow speed in both of the forwarding sub-pipes 212 and 214, the sub-pipe 214 which is farther from the corner where the fluid flows into is designed to have a smaller pipe diameter so as to increase the flow resistance in the sub-pipe 214, while the sub-pipe 212 which is closer to the corner where the fluid flows into is designed to have a larger pipe diameter so as to reduce the flow resistance in the sub-pipe 212. Similarly, to equalize the flow speed in both of the reversed sub-pipes 222 and 224, the sub-pipe 224 which is farther from the corner where the fluid flows into is designed to have a smaller pipe diameter, while the sub-pipe 222 which is closer to the corner where the fluid flows into is designed to have a larger pipe diameter. In this manner, the heat transfer rate can be improved. It should be noted that the presence of two sub-pipes is merely for illustration, and the present invention should not limited to any number of sub-pipes. In addition, although in the preferred embodiment described above the sub-pipes should have different diameters, the same-sized sub-pipes are still within the scope of the present invention.

Figure 3:
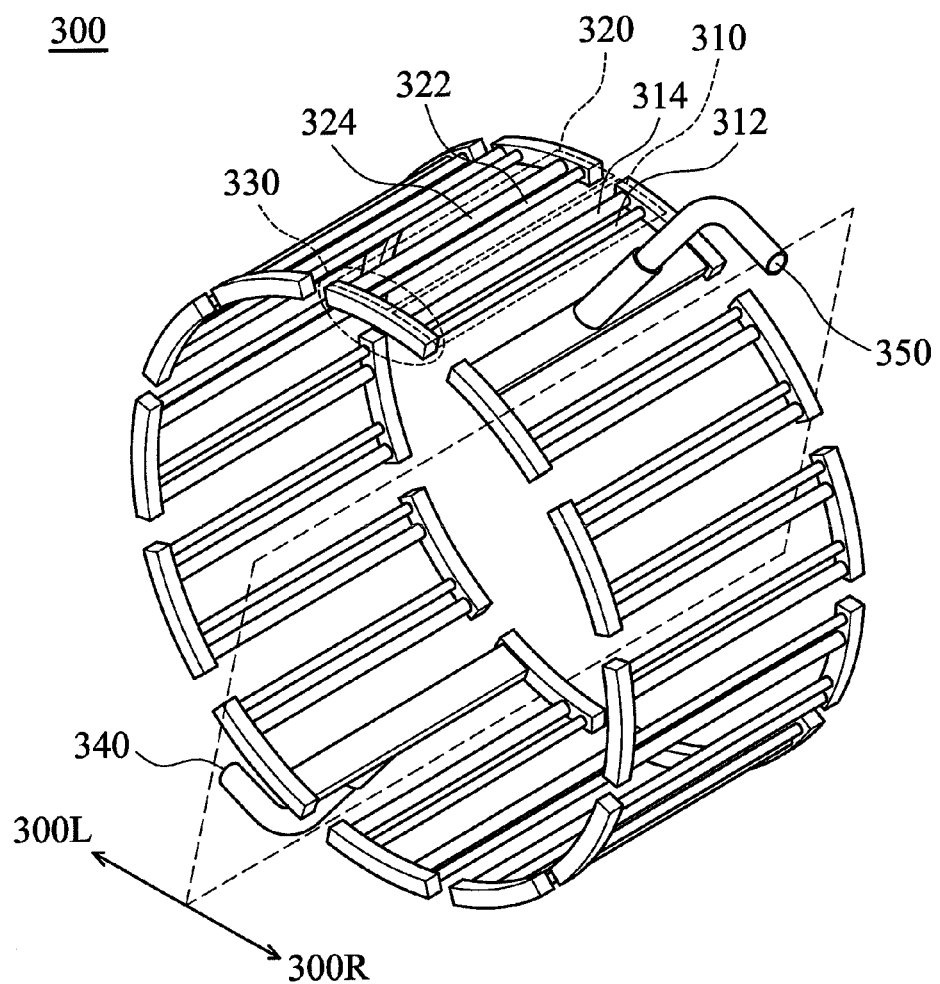
FIG. 3 is a 3D view of the cooling jacket according to another embodiment of the present invention.

FIG. 3 is a 3D view of the cooling jacket according to another embodiment of the present invention. It can be seen in FIGS. 2A and 3 that the cooling jacket in FIG. 2 has only one set of wave-shaped pipes so that the working fluid after being injected through the working fluid inlet 240 flows through only one path before being expelled though the working fluid outlet 250 which is at the same side of the inlet 240. The cooling jacket in FIG. 3, however, has two sets of wave-shaped pipes so that the working fluid after being injected through the working fluid inlet 340 is divided to flow into the wave-shaped pipe 300R and 300L along two opposite paths before being expelled through the working fluid outlet 350, which is at the opposite side of the inlet 340 (in this embodiment, the inlet 340 and the outlet 350 are in a straight line). In other embodiments, the two sets of wave-shaped pipes 300R and 300L may respectively have distinct inlets and outlets, but in this embodiment, for reasons of saving costs, the two sets of the wave-shaped pipes 300R and 300L share the same working fluid inlet 340 and the same working fluid outlet 350.

Figure 4A:
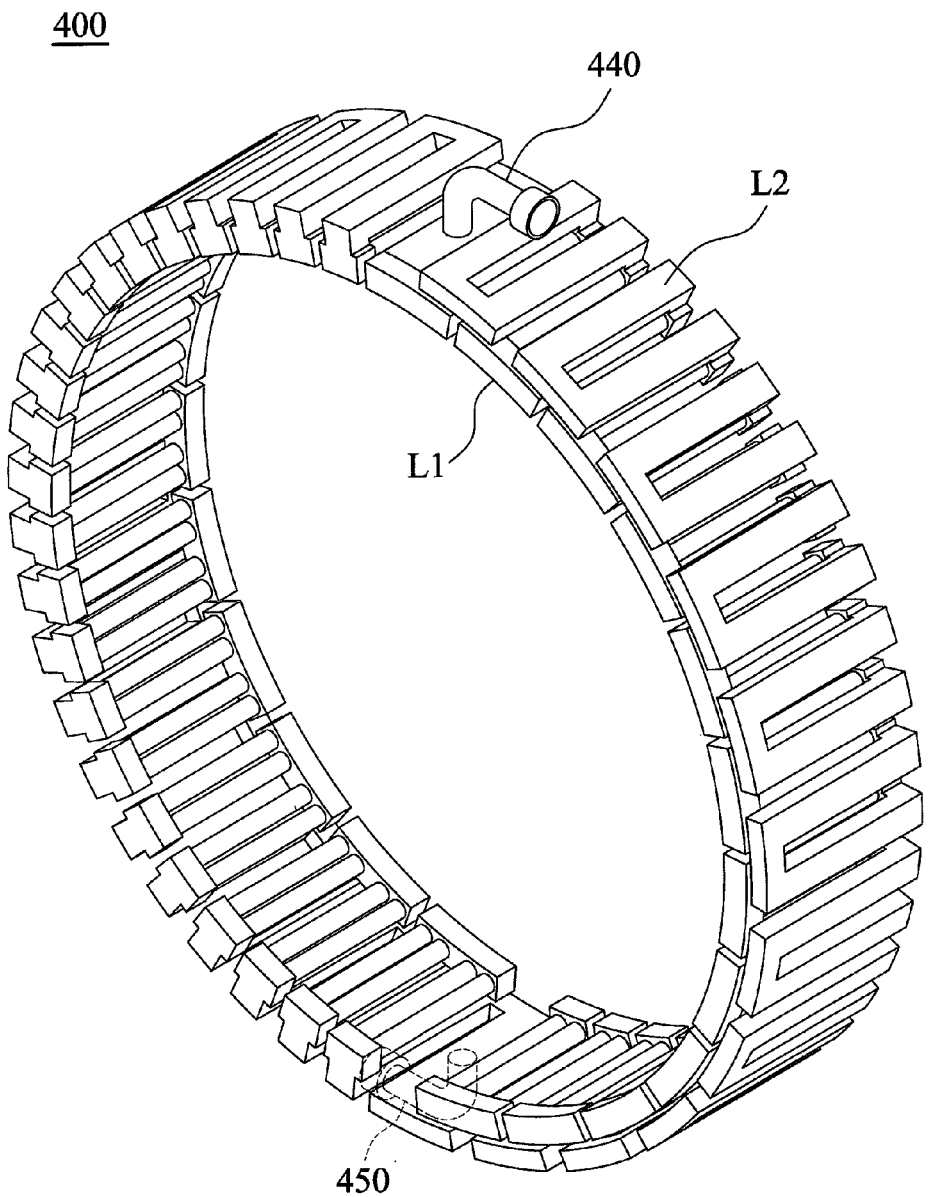
FIG. 4A is a 3D view of a two-layered cooling jacket according to an embodiment of the present invention.
Figure 4B:
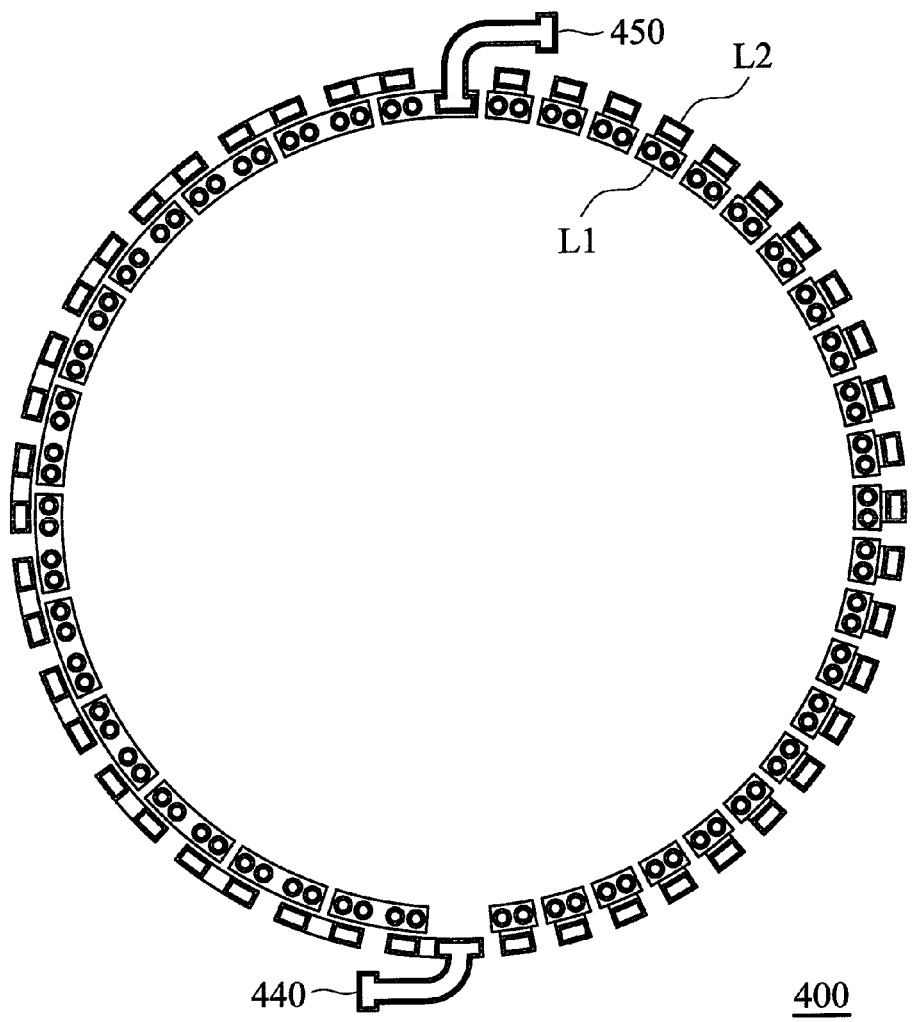
FIG. 4B is the profile of the cooling jacket 400 in FIG. 4A.

FIG. 4A is a 3D view of a two-layered cooling jacket according to an embodiment of the present invention. FIG. 4B is the profile of the cooling jacket 400 in FIG. 4A. FIG. 4B, shows an inner layer L1 and an outer layer L2. The cooling jacket 400 has an inner layer L1 and an outer layer L2, where each layer may have continuous wave-shaped pipes having the same structure as, or a similar structure to, those described above. In some embodiments, each layer has its own, dependent working fluid inlet and outlet. In some embodiments, the inlets of the two layers may be disposed on opposite sides of the cooling jacket to make the working fluid in the layers flow in opposite directions for preventing heat concentration and improving heat dissipation. In this embodiment shown in FIGS. 4A and 4B, these two layers share the same working fluid inlet 440 and working fluid outlet 450. In addition, each of the turning portions between the forwarding portions and the reversed portions may extend along a circumferential direction or a radial direction so that the working fluid can repeatedly flow from the inner layer L1 to the outer layer L2 and from the outer layer L2 to the inner layer L1 and use the outer layer to release heat to the air, improving the heat dissipating ability.

Figure 5A:
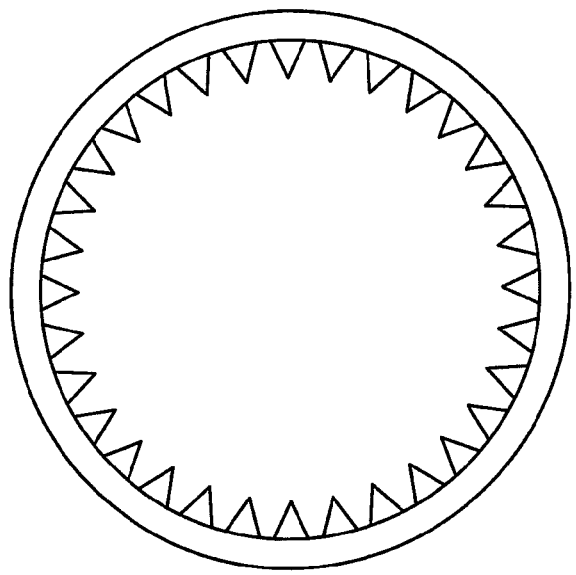
FIGS. 5A and 5B respectively show the inside of one of the pipes described in the previous embodiments.
Figure 5B:
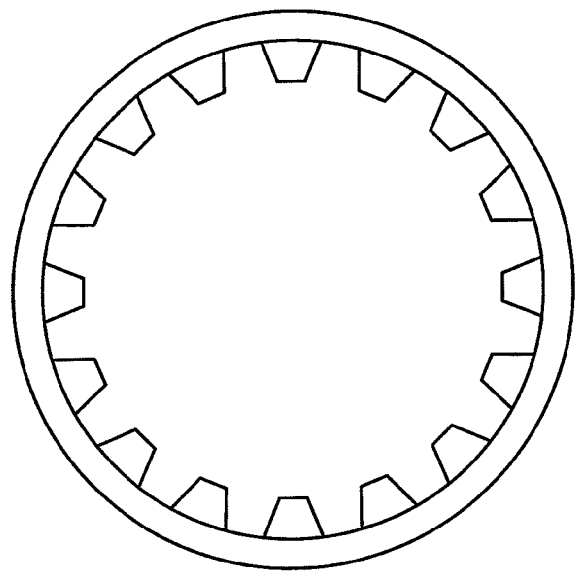

For further improving heat dissipating ability, the present invention further provides a special design. FIGS. 5A and 5B show the inside of one of the pipes described in the previous embodiments. As shown in these Figures, the heat-dissipating fins are disposed in the inside of the pipes which includes the forwarding, reversed or turning portions. The material of the fins may be the same as or different from that of the pipe wall. The purpose of using the fins is to expand the area of contact between the pipe wall and the working fluid and increase the heat exchange rate. The heat-dissipating fins of the present invention may be made and embedded in the pipe with a shape such as a sawtooth, arrowhead, or sheet. Since the shape of the heat-dissipating fins can be designed according to the heat dissipating need, the present invention is not limited to those shapes shown in FIGS. 5A and 5B.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A cooling jacket for cooling an electric motor, comprising:
   one or more wave-shaped pipes, covering the electric motor, for conducting working fluid, wherein each wave-shaped pipe comprises:
      a forwarding portion and a reversed portion, parallel to the axis of the electric motor, for conducting the working fluid to flow in opposite directions, wherein the forwarding portion comprises at least two forwarding sub-pipes, and the reversed portion comprises at least two reversed sub-pipes; and
      a turning portion, connected between the forwarding portion and the reversed portion,
   wherein in the at least two forwarding sub-pipes, the forwarding sub-pipe which has a longer distance from a starting end of the wave-shaped pipe has a smaller pipe diameter than the other forwarding sub-pipes; and in the at least two reversed sub-pipes, the reversed sub-pipe which has longer distance from the starting end of the wave-shaped pipe has a smaller pipe diameter than the other reversed sub-pipes.

2. The cooling jacket as claimed in claim 1, wherein the cooling jacket has two sets of wave-shaped pipes, and the two sets of the wave-shaped pipe share a working fluid inlet.

3. The cooling jacket as claimed in claim 1, wherein the cooling jacket has two sets of the wave-shaped pipe, and the two sets of the wave-shaped pipe share a working fluid outlet.

4. The cooling jacket as claimed in claim 1, further comprising a working fluid inlet and a working fluid outlet, respectively disposed at two opposite sides of the axis of the electric motor.

5. The cooling jacket as claimed in claim 1, wherein the turning portion extends along a circumferential direction of the electric motor.

6. The cooling jacket as claimed in claim 1, wherein the turning portion extends in a radial direction of the electric motor.

7. The cooling jacket as claimed in claim 1, wherein there are a plurality of heat-dissipating fins on the inside of the forwarding sub-pipes and/or the reversed sub-pipes.

8. The cooling jacket as claimed in claim 7, wherein the heat-dissipating fins are a sawtooth shape.

9. The cooling jacket as claimed in claim 1, wherein the working fluid in any two sets of the wave-shaped pipes flows in opposite directions.

* * * * *